Dec. 13, 1966 C. S. DEN BRINKER 3,292,105
ASTABLE MULTIVIBRATOR CIRCUITS EMPLOYING
AUXILIARY DISCHARGE PATHS FOR CROSS
COUPLING CAPACITORS
Filed Sept. 17, 1963 2 Sheets-Sheet 1

INVENTOR
CARL S. DEN-BRINKER

BY John D. Graham
ATTORNEY 3,292,105

ASTABLE MULTIVIBRATOR CIRCUITS EMPLOYING AUXILIARY DISCHARGE PATHS FOR CROSS COUPLING CAPACITORS

Carl S. den Brinker, Brickhill, Bedford, England, assignor to Texas Instruments Incorporated, Dallas, Tex., a corporation of Delaware Filed Sept. 17, 1963, Ser. No. 309,921
1 Claim. (Cl. 331—113)

This invention relates to astable multivibrator circuits and particularly to such circuits capable of operation at relatively high frequencies.

In one known astable multivibrator circuit, two transistors have their base and collector electrodes cross-coupled by capacitors and respective resistors connected to the base electrodes provide discharge paths for the capacitors. The transistors are switched alternately between ON and OFF conditions, the switching being controlled by the charging and discharging of the coupling capacitors.

The effect of transistor parameters must be carefully considered if the switching operations are to be independent of those parameters. One parameter which can affect the switching operation is the electric charge—$Q_{B(OFF)}$—which has to be removed from the base in order that the transistor can be changed from a stable ON condition to a stable OFF condition. The charge is in series with the coupling capacitor connected to the base of the transistor concerned and, since the charge may vary from one transistor to another, it preferably is made small compared with the total charge on that coupling capacitor immediately prior to commencement of a switching operation.

Further, the charge $Q_{B(OFF)}$ increases as the discharge path resistor, connected to the base of the transistor, is decreased in value. Thus, if relatively high frequency operation of the circuit is required, timing accuracy of the switching operations is not easily maintained. Another consideration is that if the discharge path resistors are made too small in value, the increase in base current of the transistors, when in an ON state, will cause heavy saturation of the transistors with the result that regeneration cannot occur and both transistors remain continuously in an ON state.

It is an object of the present invention to provide an astable multivibrator circuit which, to some extent at least, avoids the disadvantages referred to above.

According to the present invention, an astable multivibrator circuit includes first and second transistors, the base and collector electrodes of which are cross-coupled by respective capacitors, resistors connected to the base electrodes of the respective transistors to provide first discharge paths for the coupling capacitors, and second discharge paths for the coupling capacitors effectively in parallel with and having a lower impedance than the first discharge paths.

The transistors each may have a collector load resistor which is connected by a further resistor to the base electrode of the transistor to provide the second discharge path for that transistor.

Alternately, the coupling capacitors may be connected by respective unidirectional conductive devices to a common second discharge path, the unidirectional conductive devices being so arranged that they are alternately biased to conductive and non-conductive conditions, one device being conductive when the other is non-conductive.

In a preferred embodiment of the invention, the coupling capacitors are connected by respective semiconductor diodes to one end of a common resistor, which conveniently is variable, whose other end is connected to a reference potential supply terminal, in order to provide the second discharge paths, and the emitter electrodes of the transistors are connected to ground by respective resistors. The emitter resistors and the reference potential are so chosen that the diodes alternately are biased to conductive and non-conductive conditions, one diode being conductive when the other is non-conductive.

In a circuit embodying the invention, each of the coupling capacitors discharges through two parallel discharge paths and the resistance of the second path may be made sufficiently small that the circuit operates at a relatively high frequency while maintaining the capacitance of the coupling capacitors at such a value that the charge associated with the base of each of the transistors does not appreciably effect the frequency of operation of the current. At the same time, the resistance of each of the first discharge paths may be maintained at a sufficiently high value that the associated transistor does not conduct under heavy saturation conditions.

In embodiments of the invention utilizing a second discharge path common to both transistors, a variable frequency output is easily obtainable by making the resistance of the common discharge path variable.

Circuits embodying the invention may be constructed to generate a symmetric or an asymmetric output.

By way of example, embodiments of the invention will be described in greater detail with reference to the accompanying drawings, in which.

Figure 2:
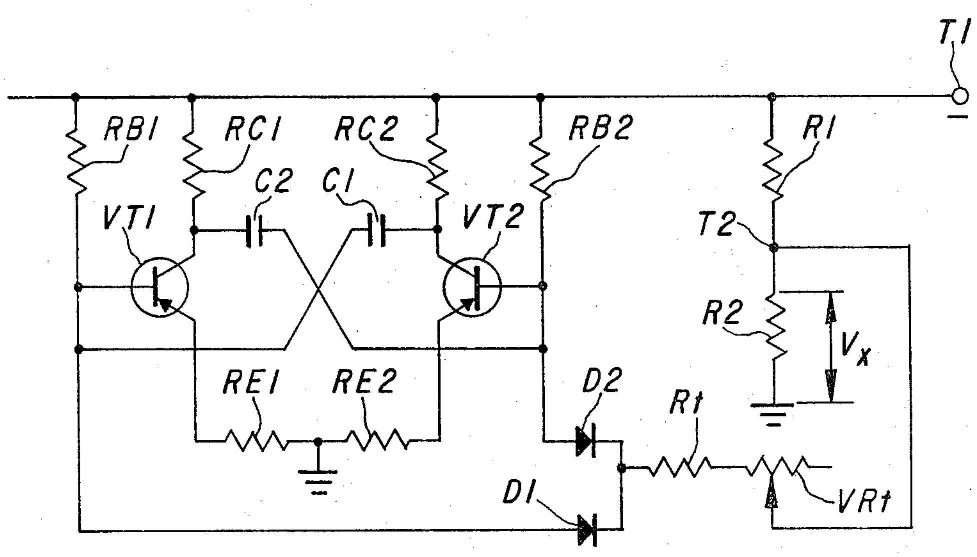
FIGURE 2 shows a further embodiment.

FIGURES 3*a*–3*e* show waveforms associated with FIGURE 2.

Figure 1:
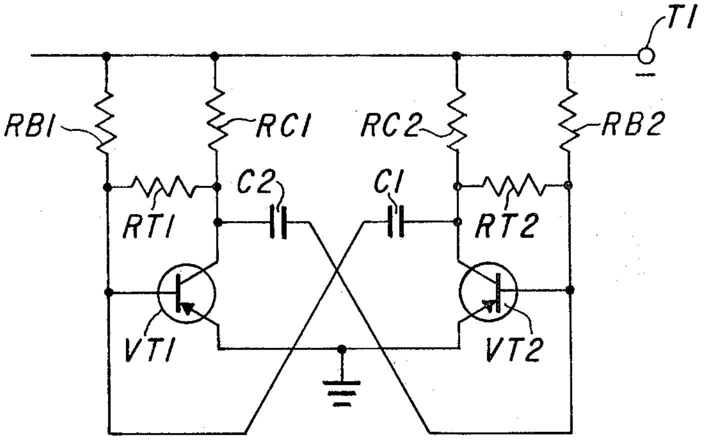
FIGURE 1 shows an embodiment.

FIGURE 1 shows the circuit of an astable multivibrator having transistors VT1 and VT2 whose base and collector electrodes are cross-coupled by capacitors C1 and C2. The transistors have collector load resistors RC1 and RC2 and resistors RB1 and RB2, connected to the base electrodes of the transistors, provide respective first discharge paths for the capacitors C1 and C2. Resistors RT1 and RT2 connect the base and collector electrodes of transistors VT1 and VT2 respectively, the resistors RT1, RC1 and RT2, RC2 providing second discharge paths for the capacitors C2 and C1 respectively. The circuit is biased by a suitable potential connected to a supply terminal T1.

The circuit operates as follows. Assume that transistor VT1 is non-conducting (OFF) and that transistor VT2 is conducting (ON). When the transistor VT1 switches to an ON condition, the change in potential across the capacitor C2 drives the base of transistor VT2 positive and transistor VT2 is switched to an OFF condition. The capacitor C2 then commences to discharge through the parallel discharge paths RB2 and RT2, RC2. The base potential of the transistor VT2 falls in a negative direction at a rate determined by the time constant of the discharge path for the capacitor C2. When the base potential is sufficient to forward bias the base-emitter path of the transistor VT2, the latter is switched to an ON condition, transistor VT1 having its base driven positive, and switching to an OFF condition, by reason of the change in potential across the capacitor C1. The capacitor C1 then commences to discharge through the parallel discharge paths RB1 and RT1, RC1 until transistor VT1 again is switched ON and the transistor VT2 switched OFF, and the process continues in a regenerative manner.

The interval P1 between successive ON conditions of transistor VT1 is determined by the time constant C1, R1, where $$R1=\frac{RB1(RT1+RC1)}{RB1+RT1+RC1} \qquad (1)$$

Similarly, the interval P2 between successive ON conditions of transistor VT2 is determined by the time constant C2, R2, where $$R2=\frac{RB2(RT2+RC2)}{RB2+RT2+RC2} \qquad (2)$$

It is normal practice to design the circuit in such manner that $$P1=0.7C1R1$$
$$P2=0.7C2R2$$

From the expressions 1 and 2 above, it will be appreciated that the time constants C1R1 and C2R2 may be made small, for high frequency operation, without having to reduce RB1 and RB2 to values which would lead to heavy saturation of transistors VT1 and VT2 when in an ON condition. The circuit of FIGURE 1 permits also the maintenance of capacitors C1 and C2 at values for which the effects of the charges associated with the bases of the transistors have a negligible effect on the operation of the circuit.

FIGURE 2 shows a circuit embodying the invention and having transistor VT1 and VT2, resistors RB1, RB2, RC1, RC2 and capacitors C1 and C2 interconnected in the manner described with reference to FIGURE 1. However, the FIGURE 2 circuit does not include resistors RT1 and RT2 but instead the base electrodes of transistors VT1 and VT2 are connected by respective semiconductor diodes D1 and D2 to a common second discharge path comprising a fixed resistor R$t$ and a variable resistor VR$t$ whose slider is connected to a potential, V$x$, derived from a point T2 on a potentiometer R1, R2 connected between terminal T1 and ground. The emitter electrodes of transistors VT1 and VT2 are connected to ground by resistors RE1 and RE2 respectively.

The potential V$x$ is so chosen that, when transistor VT1 is in an ON condition, the diode D2 is forward biased and the diode D1 is reverse biased. Likewise, when transistor VT2 is in an ON condition, the potential V$x$ is required to reverse bias diode D2 and forward bias the diode D1.

Thus, for VT1 in an ON condition:

$$Vx>VD_2+V^1_{be} \qquad (3)$$

and $$Vx<\frac{V_S \cdot RE1}{RE1+RC1}+V_{be} \qquad (4)$$

where $VD2$=forward voltage across the diode D1

$V^1_{be}$=forward voltage across the base-emitter path of transistor VT1

$V_{be}$=forward voltage across the base-emitter path of a transistor, either V$t$1 or VT2 (the forward voltage for VT2 will be later referred to as $V_{be}{}^2$)

$V_S$=supply voltage connected to terminal T1.

Expressions for V$x$ when the VT2 is in an ON condition follow from the relationship 3 and 4 above.

The operation of the circuit shown in FIGURE 2 will be explained with reference to the waveforms shown in FIGURE 3.

Assume that the circuit conditions are those illustrated at time $t_0$, i.e. transistor VT1 is in an ON condition and transistor VT2 is in an OFF condition. The base of transistor VT2 is at a positive voltage and is recovering in a negative direction, as shown by FIGURE 3$b$, as the capacitor C2 discharges. The capacitor C2 is discharged by current flow through resistors RE1 and RB2 and also, since the conditions of relationship 3 hold, by current flow through resistor RE1, diode D2, and resistors R$t$ and VR$t$, the two discharge paths effectively being in parallel with each other.

Figure 3:
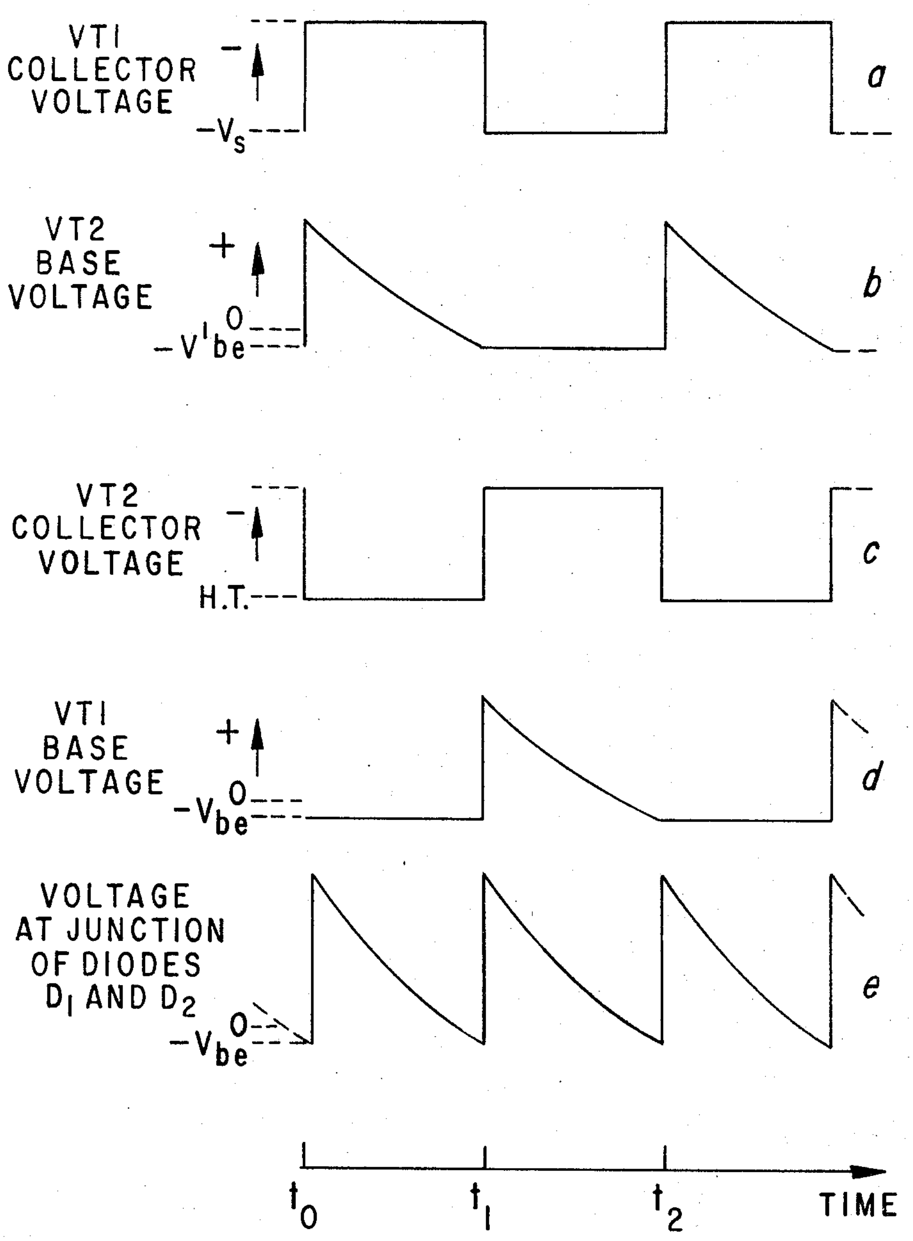

When the base potential of transistor VT2 has fallen to a value $-V_{be}$, i.e. at time $t_1$, that transistor commences to conduct, and the change in voltage across capacitor C1 takes the base of transistor VT1 positive as shown in FIGURE 3$d$, switching that transistor to an OFF condition, while transistor VT2 is switched to an ON condition.

When VT2 reaches an ON condition, the potential on the anode of diode D2 becomes $$-\frac{V_S \cdot RE2}{RE2+RC3}+V_{be}$$

and its cathode potential virtually $-Vx$ which is designed to be less than the anode potential (c.f. relationship 4) and diode D2 is reverse biased.

When the base of transistor VT1 becomes positive, the diode D1 becomes forward biased (c.f. relationship 3) and base of transistor VT1 commences to recover in a negative direction, as shown by FIGURE 3$d$, due to discharge of the capacitor C1. The capacitor C1 discharges through two effectively parallel paths, the first through resistor RE2, transistor VT2 and resistor RB1 and the second through resistor RE2, transistor VT2, diode D1, and resistors R$t$, VR$t$ and R1. When the base potential of transistor VT1 reaches a value $-V_{be}$, at time $T_2$, that transistor commences to conduct and by cumulative action transistor VT2 is switched to an OFF condition, the cycle of operations being repeated as described above.

The variation of the voltage at the junction of the diodes D1 and D2 with the resistor R$t$ is shown in FIGURE 3$e$.

The rate of discharge of capacitor C1 is determined by a time constant $T_3=R_3C1$ where $R_3$ is, since $$RB1 \gg RE2 \ll Rt+VRt$$

effectively equal to $$\frac{RB1(Rt+VRt)}{RB1+Rt+VRt}$$

Likewise, the rate of discharge of capacitor C2 is determined by a time constant $T_4=R4C2$ where R4 is, since $$RB2 \gg RE1 \ll Rt+VRt$$

effectively equal to $$\frac{RB2(Rt+VRt)}{RB2+Rt+VRt}$$

When transistors VT1 and VT2 are in an ON condition, their effective base resistances are RB1 and RB2 respectively whose values can be made such that neither transistor conducts under heavy saturation conditions, even at relatively high frequency operation, by making $(Rt+VRt)$ small compared with either RB1 or RB2.

It will be appreciated that the potential V$x$ may be derived in ways other than that shown in FIGURE 2. However when so derived, a maximum value of that potential is defined as follows:

$$Vx<\frac{V_S \cdot RE1}{RE1+RC1}+V^1_{be}$$

when transistor VT1 is conducting and $$Vx<\frac{V_S \cdot RE2}{RE2+RC2}+V^2_{be}$$

when transistor VT2 is conducting.

As with the circuit of FIGURE 1, it will be appreciated that relatively high frequency operation of the FIGURE 2 circuit can be obtained without the base charge of either transistor having any significant effect on the circuit operation, and the values of the base resistors RB1 and RB2 may be maintained at values which prevent the transistors VT1 and VT2 conducting under conditions of heavy saturation.

The FIGURE 2 circuit can be constructed to produce a symmetric or asymmetrical output whose frequency can be varied, without affecting the mark-to-space ratio, by adjustment of the variable resistor VR$t$.

What is claimed is:

An astable multivibrator circuit comprising first and second transistors each having a collector, a base, and an emitter, the emitter of each transistor being connected to a reference potential by conductive means, the collector of each transistor being connected to a supply potential through one of a pair of separate load resistors, first and second base resistors, the first base resistor being connected between the base of the first transistor and the supply potential, the second base resistor being connected between the base of the second transistor and the supply potential, first and second coupling capacitors, the first coupling capacitor being connected between the base of the first transistor and the collector of the second transistor, the second coupling capacitor being connected between the base of the second transistor and the collector of the first transistor, the first and second base resistors providing a primary discharge path for the first and second coupling capacitors, respectively, first and second unidirectionally conductive devices, the first unidirectionally conductive device being connected between the base of the first transistor and a common point, the second unidirectionally conductive device being connected between the base of the second transistor and said common point, said common point being connected through variable resistive means to a constant voltage source having a magnitude between that of said reference potential and that of said supply potential, said magnitude being less than the sum of the forward voltage across the base-emitter path of either of the transistors plus the value of said supply potential multiplied by the ratio of any impedance in the path between the emitter of either of the transistors to the sum of the resistance in the emitter and collector path of either of the transistors, whereby in operation said unidirectional conductive devices are each alternatively forward and reverse biased to connect the first and second coupling capacitors one at a time through said resistive means to said voltage source to provide the coupling capacitor so connected a secondary discharge path in parallel with said primary discharge path, the secondary discharge path having a lower impedance than either of said primary discharge paths.

References Cited by the Examiner

UNITED STATES PATENTS 3,129,391 4/1964 Kabell ------------ 331—113 X
3,204,200 8/1965 White ------------ 331—113 X

FOREIGN PATENTS 1,245,754 10/1960 France.

ROY LAKE, *Primary Examiner.*

S. H. GRIMM, *Assistant Examiner.*